(12) United States Patent
Tang et al.

(10) Patent No.: US 11,362,395 B2
(45) Date of Patent: Jun. 14, 2022

(54) END COVER ASSEMBLY, SECONDARY BATTERY, BATTERY PACK AND ELECTRIC DEVICE

(71) Applicant: Contemporary Amperex Technology Co., Limited, Fujian (CN)

(72) Inventors: Huaichao Tang, Fujian (CN); Wei Li, Fujian (CN); Kai Wu, Fujian (CN); Chengdu Liang, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/565,490

(22) Filed: Dec. 30, 2021

(65) Prior Publication Data

US 2022/0123418 A1 Apr. 21, 2022

Related U.S. Application Data

(63) Continuation of application No. PCT/CN2020/088480, filed on Apr. 30, 2020.

(51) Int. Cl.
*H01M 50/583* (2021.01)
*H01M 50/271* (2021.01)
(Continued)

(52) U.S. Cl.
CPC ....... *H01M 50/271* (2021.01); *H01M 50/505* (2021.01); *H01M 50/55* (2021.01); *H01M 50/583* (2021.01); *H01M 2220/20* (2013.01)

(58) Field of Classification Search
CPC .. H01M 50/271; H01M 50/505; H01M 50/55; H01M 50/583; H01M 2220/20
See application file for complete search history.

(56) References Cited

U.S. PATENT DOCUMENTS

| 2013/0011703 A1* | 1/2013 | Kim | H01M 50/103 |
| | | | 429/61 |
| 2013/0089760 A1* | 4/2013 | Kim | H01M 50/543 |
| | | | 429/61 |

(Continued)

FOREIGN PATENT DOCUMENTS

| CN | 102867933 A | 1/2013 |
| CN | 103247817 A | 8/2013 |

(Continued)

OTHER PUBLICATIONS

The extended European search report for EP Application No. 20913058.2, dated Mar. 23, 2022, 8 pages.

(Continued)

*Primary Examiner* — Michael L Dignan
(74) *Attorney, Agent, or Firm* — Law Offices of Liaoteng Wang (57) ABSTRACT

The disclosure relates to an end cover assembly, a secondary battery, a battery pack and an electric device. An end cover assembly for a secondary battery includes: an end cover; a first terminal including a first connecting section and a second connecting section disposed along a radial direction; a second terminal including a third connecting section, a fuse section and a fourth connecting section sequentially connected along the radial direction; along an axial direction, orthographic projections of the first and third connecting sections at least partially overlap with each other, one of the first and third connecting sections is configured to connect with a busbar, the other is configured to connect with an electrode assembly, the fourth connecting section is configured to connect with the second connecting section; and an insulating component, at least a part of which is located between the first connecting section and the third connecting section.

20 Claims, 8 Drawing Sheets

(51) Int. Cl.
*H01M 50/505* (2021.01)
*H01M 50/55* (2021.01)

(56) References Cited

U.S. PATENT DOCUMENTS

| | | | |
|---|---|---|---|
| 2016/0260956 A1* | 9/2016 | Jang | H01M 50/183 |
| 2017/0062795 A1 | 3/2017 | Byun et al. | |
| 2017/0250394 A1 | 8/2017 | Wakimoto et al. | |
| 2019/0140252 A1* | 5/2019 | Guen | H01M 50/572 |
| 2020/0091492 A1* | 3/2020 | Guen | H01M 50/502 |

FOREIGN PATENT DOCUMENTS

| | | | |
|---|---|---|---|
| CN | 104241589 | A | 12/2014 |
| CN | 204946996 | U | 1/2016 |
| CN | 106207075 | A | 12/2016 |
| CN | 107017381 | A | 8/2017 |
| CN | 107134559 | A | 9/2017 |
| CN | 109314219 | A | 2/2019 |
| CN | 208819925 | U | 5/2019 |
| CN | 210040385 | U | 2/2020 |
| DE | 102013200923 | A1 | 8/2014 |
| KR | 20160106427 | A | 9/2016 |
| WO | 2020057442 | A1 | 3/2020 |

OTHER PUBLICATIONS

The International search report for PCT Application No. PCT/CN2020/088480, dated Jan. 27, 2021, 18 pages.
The notification to grant for CN Application No. 202080005727.2, dated Apr. 6, 2022, 7 pages.

* cited by examiner

END COVER ASSEMBLY, SECONDARY BATTERY, BATTERY PACK AND ELECTRIC DEVICE

CROSS-REFERENCE TO RELATED APPLICATION

This application is a continuation of International Application No. PCT/CN2020/088480, filed on Apr. 30, 2020, which is incorporated herein by reference in its entirety.

FIELD

The disclosure relates to a technical field of battery, and in particular to an end cover assembly, a secondary battery, a battery pack and an electric device.

BACKGROUND

With developments of society, science and technology, secondary batteries are widely used to power high power devices, such as electric vehicles. A battery pack is formed by connecting a plurality of secondary batteries in series or in parallel to achieve a larger capacity or power.

The secondary battery includes a case, an electrode assembly disposed in the case, an end cover assembly connected to the case, and a connecting component for connecting the electrode assembly and the terminal assembly. The connecting component includes a fuse section for cutting off a main circuit. When the secondary battery encounters overcurrent or other conditions in use, the fuse section on the connecting component will be fused to cut off the main circuit. However, during the use of the secondary battery, there may be a case where the fuse section has been fused while the secondary battery still catches fire, which affects a safety of use of the secondary battery.

SUMMARY

The disclosure provides an end cover assembly, a secondary battery, a battery pack, and an electric device. The end cover assembly can reduce a possibility that the fuse section will be electrically re-connected after the fuse section has been fused, and ensure a safety of use of the secondary battery.

The disclosure provides an end cover assembly for a secondary battery, which includes:

an end cover including an electrode lead-out hole; a first terminal including a first connecting section and a second connecting section disposed along a radial direction of the electrode lead-out hole; a second terminal including a third connecting section, a fuse section and a fourth connecting section that are sequentially connected along the radial direction; along an axial direction of the electrode lead-out hole, an orthographic projection of the first connecting section and an orthographic projection of the third connecting section at least partially overlap with each other, one of the first connecting section and the third connecting section is configured to connect with a busbar, the other is configured to connect with an electrode assembly, and the fourth connecting section is configured to connect with the second connecting section; and an insulating component, at least a part of which is located between the first connecting section and the third connecting section.

According to an aspect of the disclosure, the third connecting section, the fuse section and the fourth connecting section form an integral structure.

According to an aspect of the disclosure, the insulating component extends between the fuse section and the first connecting section.

According to an aspect of the disclosure, an overcurrent capacity of the fuse section is smaller than overcurrent capacities of the third connecting section and the fourth connecting section.

According to an aspect of the disclosure, the second terminal is located at a side of the first terminal away from the end cover.

According to an aspect of the disclosure, the third connecting section includes a convex portion protruding toward the first connecting section; and/or the first connecting section includes an extending portion, which protrudes in a direction away from the third connecting section, wherein at least a part of the extending portion is located in the electrode lead-out hole.

According to an aspect of the disclosure, the end cover assembly further includes a fixing component, wherein a part of the fixing component at a side of the third connecting section away from the first connecting section presses against an edge of the third connecting section and/or an edge of the fourth connecting section, so that the first terminal and the second terminal are fixed to the end cover through the fixing component.

According to an aspect of the disclosure, a part of the insulating component is located below the edge of the third connecting section and/or the edge of the fourth connecting section, and along the axial direction, an orthographic projection of the insulating component and an orthographic projection of the fixing component have an overlap area.

According to an aspect of the disclosure, the end cover assembly further includes an insulating protection member, and a part of the insulating protection member is located at a side of the fuse section away from the first terminal and covers the fuse section.

According to an aspect of the disclosure, the insulating protection member covers the fourth connecting section.

According to an aspect of the disclosure, the insulating protection member further includes an inserting portion, and the inserting portion extends into a gap formed by the third connecting section, the fuse section and the fourth connecting section.

According to an aspect of the disclosure, the first terminal is located at a side of the second terminal away from the end cover.

According to an aspect of the disclosure, the end cover assembly further includes a sealing component, wherein the sealing component is disposed between the second terminal and the end cover and seals the electrode lead-out hole, and a part of the sealing component covers the fuse section.

The end cover assembly according to embodiments of the disclosure includes the end cover and the terminal assembly disposed on the end cover. The terminal assembly includes the first terminal and the second terminal that are stacked with respect to each other on the end cover. The second terminal includes the third connecting section, the fuse section and the fourth connecting section that are sequentially connected along the radial direction of the electrode lead-out hole. The terminal assembly blocks the electrode lead-out hole from the outer side of the end cover, so that the fuse section of the second terminal is located at the outer side of the end cover. In this way, it is not likely that electrolyte in the case of the secondary battery will be contact with the fuse section. When overcurrent occurs in the secondary battery, the end cover assembly according to embodiments of the disclosure can reduce a possibility that the fuse section after being fused will be wetted by the electrolyte again so that the third connecting section and the fourth connecting section will be electrically re-connected, and thereby reduce a possibility that the secondary battery will catch fire or explode after the fuse section has been fused, thereby improving the safety of use of the secondary battery.

In another aspect, according to the disclosure, a secondary battery is provided, which includes:

A case including an opening; an electrode assembly disposed in the case; and an end cover assembly as described above, wherein the end cover assembly is connected with the case to seal the opening.

In another aspect, according to the disclosure, a battery pack is provided, which includes:

Two or more secondary batteries as described above; and a busbar for connecting different secondary batteries.

In another aspect, according to the disclosure, there is provided an electric device including a secondary battery as described above.

BRIEF DESCRIPTION OF THE DRAWINGS

Features, advantages, and technical effects of exemplary embodiments of the disclosure will be described below with reference to accompanying drawings.

The views are not necessarily plotted in actual proportion in the drawings.

REFERENCE SIGNS IN THE DRAWINGS 1 electric device;
1a device body;
10 battery pack;
11 housing;
111 first housing;
112 second housing;
12 battery module;
20 secondary battery;
21 case;
22 22 electrode assembly;
221 main body;
222 tab;
23 connecting component;
30 end cover assembly;
40 end cover;
41 electrode lead-out hole;
50 terminal assembly;
51 first terminal;
511 first connecting section;
511a concave portion;
5111 extending portion;
5112 flange;
512 second connecting section;
52 second terminal;
52a gap;
521 third connecting section;
521a convex portion;
522 fuse section;
522a notch;
523 fourth connecting section;
53 insulating component;
60 fixing component;
62 insulator;
62 support;
70 sealing component;
80 insulating protection member;
81 covering portion;
82 inserting portion;
83 avoiding groove;
90 busbar;
X axial direction.

DETAILED DESCRIPTION

Below, embodiments of the disclosure will be further described in detail with reference to the drawings and embodiments. The detailed description according to the embodiments and the accompanying drawings are intended to exemplary illustrate the principles of the disclosure and are not intended to limit the scope of the disclosure, i.e., the disclosure is not limited to the described embodiments.

In the description of the disclosure, it should be noted that, unless otherwise stated, the meaning of "a plurality" is two or more (including two); the orientation or positional relationship indicated by the terms "upper", "lower", "left", "right", "inner", "outer" and the like is merely for the purpose of describing the disclosure and simplifying the description, and is not intended to indicate or imply that the device or component referred to has a particular orientation, is constructed and operated in a particular orientation, and therefore cannot be understood to be a limitation of the disclosure. Moreover, the terms "first", "second", "third" and the like are configured for descriptive purposes only and are not to be construed as indicating or implying relative importance.

The orientations in the following description are all directions shown in the drawings and are not intended to limit specific structures of the disclosure. In the description of the disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the disclosure can be understood by the person skilled in the art according to actual circumstance.

For better understanding of the disclosure, embodiments of the disclosure will be described below in detail with reference to FIGS. 1 to 14.

Figure 1:
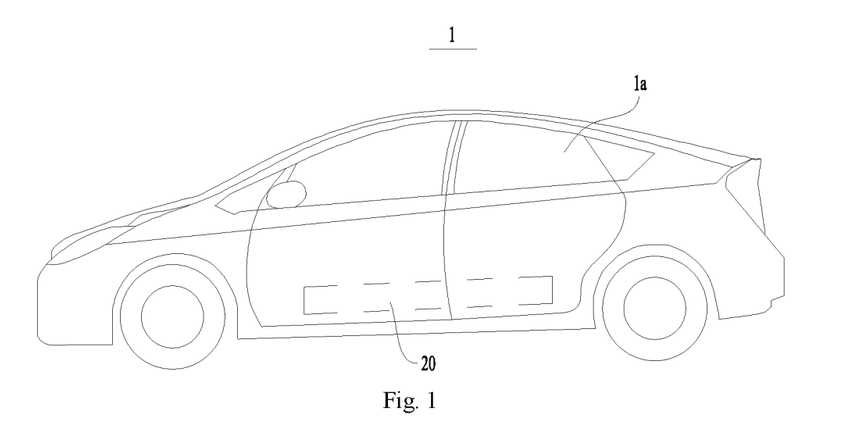
FIG. 1 is a schematic structural diagram of an electric device disclosed in an embodiment of the disclosure.
Figure 2:
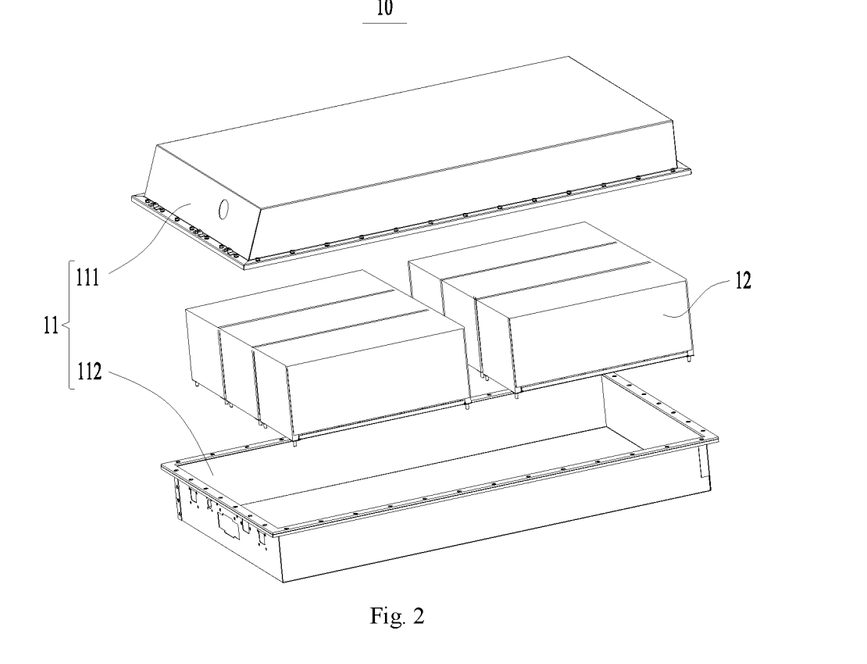
FIG. 2 is an exploded structural view of a battery pack disclosed in an embodiment of the disclosure.
Figure 3:
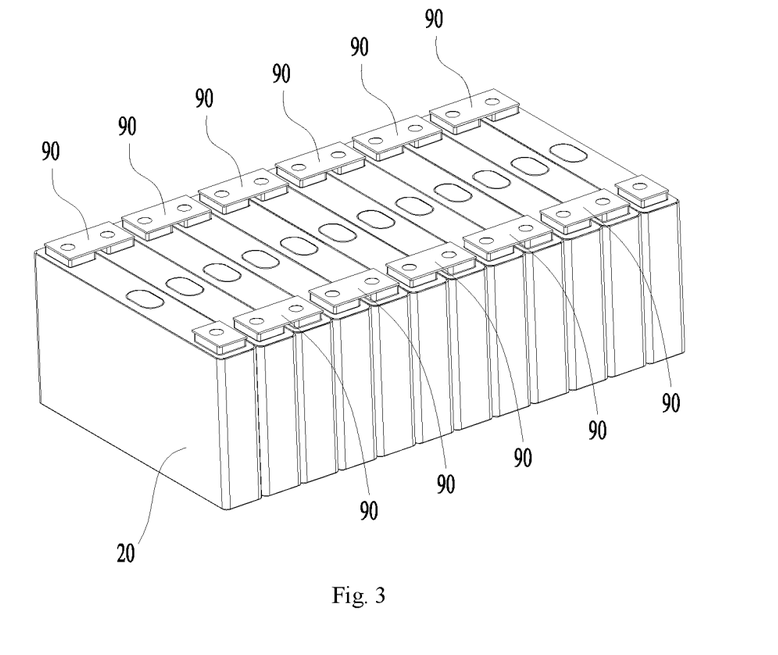
FIG. 3 is a partial structural view of a battery pack disclosed in an embodiment of the disclosure.

Embodiments of the disclosure provide an electric device 1. The electric device 1 includes a secondary battery 20. The secondary battery 20 is disposed in a device body 1*a* of the electric device 1 for supplying electric energy. In some embodiments, the electric device 1 is a mobile device such as a vehicle, a ship, a small aircraft, etc., which includes a power source, and the power source includes a secondary battery 20, and electrical energy supplied by the secondary battery 20 provides driving force for the electric device 1. In some embodiments, the driving force of the electric device 1 is all supplied by the electric energy, and at this time, the power source only includes the secondary battery 20. In other embodiments, the driving force of the electric device 1 is supplied by both the electric energy and other energy sources (for example, mechanical energy), and at this time, the power source includes the secondary battery 20 and other power equipment such as an engine. Referring to FIG. 1, taking a vehicle as an example, in some embodiments, the electric device 1 is a new energy vehicle, which may be a pure electric vehicle, a hybrid electric vehicle, an extended range vehicle, an electric tricycle, a two-wheeled electric vehicle and the like.

The battery pack 10 includes a housing 11 and a battery module 12. The battery module 12 is accommodated in the housing 11. In some embodiments, referring to FIG. 2, the housing 11 includes a first housing 111 and a second housing 112. The first housing 111 and the second housing 112 are combined together, so that a closed space is formed in the housing 11 to accommodate the secondary battery 20 and the like. The term "closed" here refers to covering or closing, in a sealed or unsealed way.

In some embodiments, the housing 11 includes side plates (not shown in the drawings) connected end to end to form a frame for accommodating the secondary battery 20. The secondary battery 20 is accommodated in the frame. In some embodiments, referring to FIG. 3, different secondary batteries 20 are electrically connected by a busbar 90 to realize serial or parallel connection between the secondary batteries 20.

In some embodiments, the battery pack may be an energy storage device such as an energy storage cabinet (not shown in the drawings); and in this case, the housing 11 may be provided with a door. The number of secondary batteries 20 accommodated in the housing 11 is not limited to one, and may be two or more.

After noticing the problem of poor safety performance of existing secondary batteries, the inventors conducted research and analysis on various structures of secondary batteries. The inventors found that since a fuse section is disposed on a connecting component of the secondary battery, the fuse section can be easily wetted by electrolyte. When the fuse section has been fused, an external voltage will cause the fuse section to generate an arc at the fused position, so that the fuse section will be electrically re-connected through the electrolyte, which will cause the fuse section to fail to cut off a main circuit, and then result in that the secondary battery may still catch fire after the fuse section has been fused and thus affect the safety of use of the secondary battery. Based on the above problems discovered by the inventors, the inventors have improved the structure of the secondary battery, and embodiments of the disclosure will be further described below.

Figure 4:
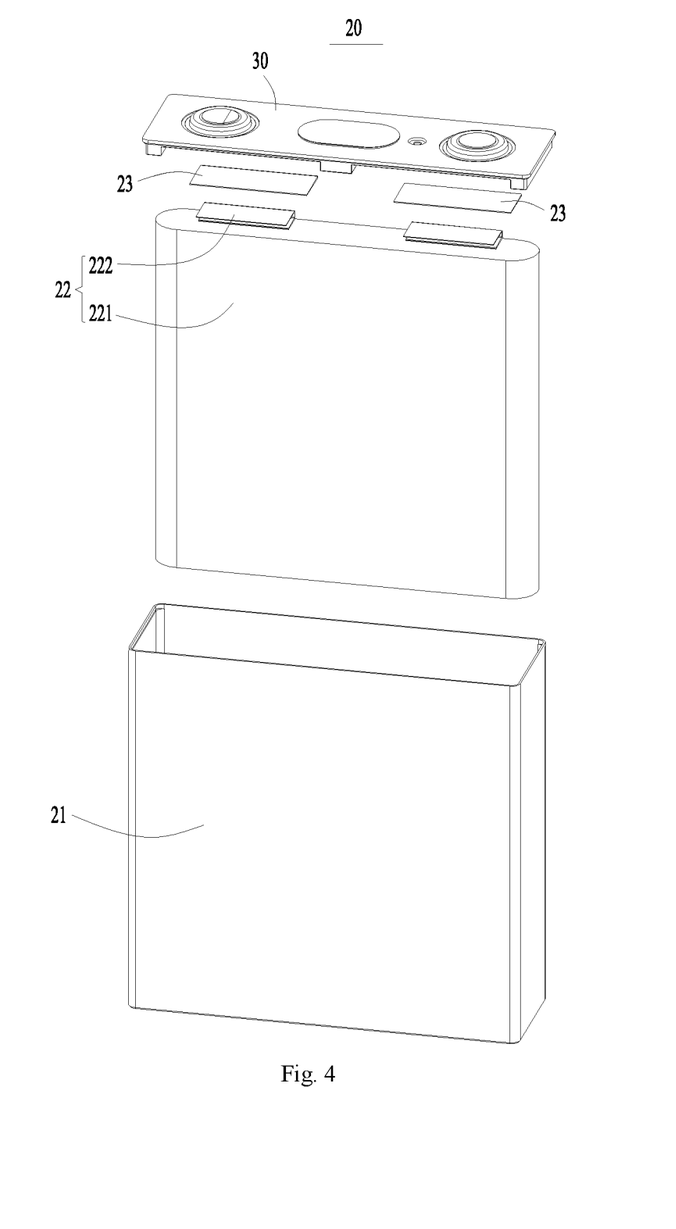
FIG. 4 is an exploded structural view of a secondary battery disclosed in an embodiment of the disclosure.

As shown in FIG. 4, the secondary battery 20 according to an embodiment of the disclosure includes a case 21, an electrode assembly 22 disposed in the case 21, and an end cover assembly 30 sealingly connected to the case 21.

The case 21 according to the embodiment of the disclosure has a square structure or other shapes. The case 21 includes an internal space for accommodating the electrode assembly 22 and electrolyte, and an opening communicating with the internal space. The end cover assembly 30 is connected with the case 21 to seal the opening. Optionally, the case 21 may be made of conductive materials such as aluminum or aluminum alloy.

The electrode assembly 22 according to the embodiment of the disclosure can be formed by stacking or winding a first electrode plate, a second electrode plate, and a separator between the first electrode plate and the second electrode plate together to form a main body 221, wherein the separator is an insulator between the first electrode plate and the second electrode plate. The main body 221 according to the embodiment has a flat overall structure. The main body 221 includes two wide surfaces and two narrow surfaces that are alternately arranged along a circumferential direction of the main body 221. The main body 221 includes two end surfaces opposite to each other in an axial direction of the main body 221. In the embodiment, the description is made by exemplarily taking the first electrode plate as a positive electrode plate and the second electrode plate as a negative electrode plate. A positive active material is coated on a coating region of the positive electrode plate, while a negative active material is coated on a coating region of the negative electrode plate. A plurality of uncoated regions extending from the coating regions of the main body 221 serve as tabs 222. The electrode assembly 22 includes two tabs 222, i.e., a positive tab and a negative tab. The positive tab extends from the coating region of the positive electrode plate while the negative tab extends from the coating region of the negative electrode plate. The tab 222 may have a multilayer structure. In the embodiment of the disclosure, from each of the two opposite end surfaces of the main body 221, one tab 222 extends.

Figure 5:
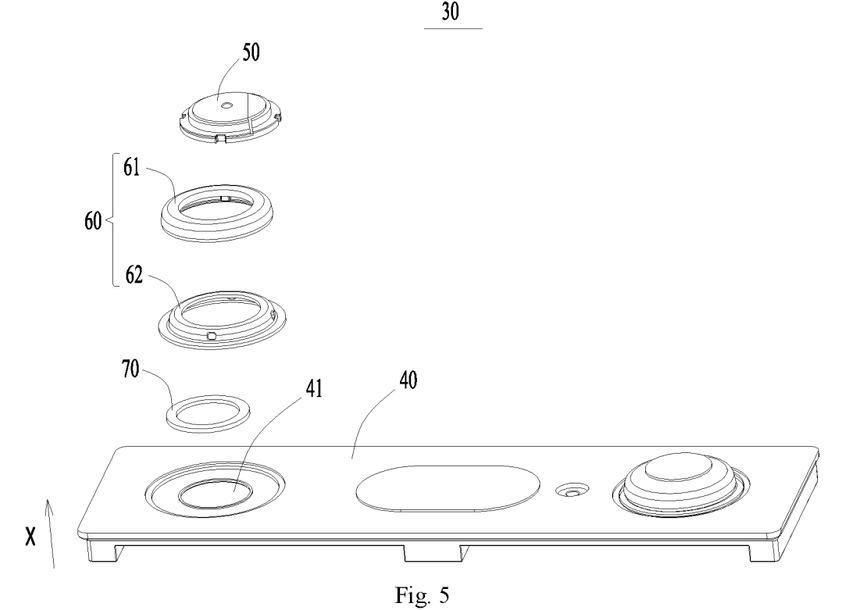
FIG. 5 is an exploded structural view of an end cover assembly disclosed in an embodiment of the disclosure.

Referring to FIG. 4 and FIG. 5, the end cover assembly 30 according to the embodiment of the disclosure includes an end cover 40 and a terminal assembly 50. The end cover 40 according to the embodiment of the disclosure includes an outer surface and an inner surface opposite to each other in a thickness direction, and an electrode lead-out hole 41 through the end cover 40. An axial direction X of the electrode lead-out hole 41 is the same as a thickness direction of the end cover assembly 30, and a radial direction of the electrode lead-out hole 41 refers to a direction perpendicular to the axial direction X of the electrode lead-out hole 41. The end cover 40 can cover the opening of the case 21 and be sealingly connected to the case 21. Along the axial direction X of the electrode lead-out hole 41, the terminal assembly 50 is fixed to the end cover 40 from an outer side of the end cover 40 and is disposed corresponding to the electrode lead-out hole 41. The outer side of the end cover 40 refers to a side of the end cover 40 away from the electrode assembly 22. The terminal assembly 50 is configured to electrically connect with the busbar 90, and the tab 222 of the electrode assembly 22 is configured to electrically connect with the terminal assembly 50. In some embodiments, a minimum diameter of the terminal assembly 50 may be greater than a maximum diameter of the electrode lead-out hole 41, so that the terminal assembly 50 covers and blocks the electrode lead-out hole 41. An electric energy of the electrode assembly 22 may be transmitted to the busbar 90 through the terminal assembly 50. The end cover assembly 30 according to the embodiment of the disclosure further includes a sealing component 70. The sealing component 70 has an annular structure. The sealing component 70 is disposed to surround the electrode lead-out hole 41. The sealing component 70 is disposed between the terminal assembly 50 and the end cover 40 and seals the electrode lead-out hole 41. The terminal assembly 50 and the end cover 40 can compress the sealing component 70. A material of the sealing component 70 may be an elastic material such as rubber or silicone.

Figure 6:
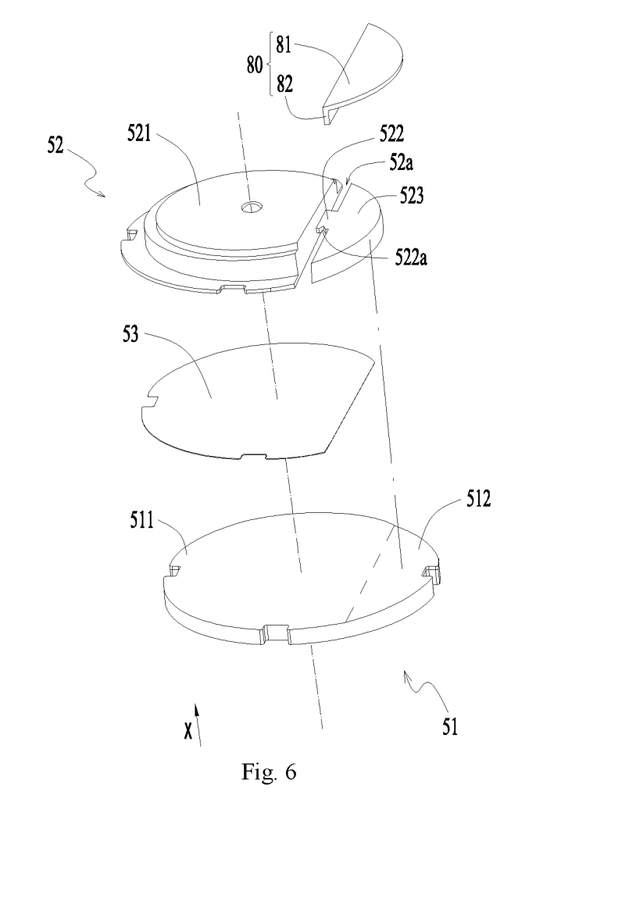
FIG. 6 is an exploded structural view of a terminal assembly disclosed in an embodiment of the disclosure.

As shown in FIG. 6, the terminal assembly 50 according to the embodiment of the disclosure includes a first terminal 51 and a second terminal 52 and an insulating component 53. The first terminal 51 includes a first connecting section 511 and a second connecting section 512 disposed along the radial direction of the electrode lead-out hole 41. In FIG. 6, a dotted line on the first terminal 51 is only used to schematically divide the first connecting section 511 and the second connecting section 512, but does not represent a physical structure. The second terminal 52 includes a third connecting section 521, a fuse section 522, and a fourth connecting section 523 that are sequentially connected along the radial direction of the electrode lead-out hole 41. The insulating component 53 is entirely disposed between the first connecting section 511 and the third connecting section 521 to prevent current from being directly conducted from the first connecting section 511 to the third connecting section 521. A surface of the first connecting section 511 facing the third connecting section 521 is completely covered by the insulating component 53. In other optional embodiments, a part of the insulating component 53 is disposed between the first connecting section 511 and the third connecting section 521, and a surface of the first connecting section 511 facing the third connecting section 521 is completely covered by the insulating component 53 or partially covered by the insulating component 53.

The fuse section 522 according to the disclosure is located at the outer side of the end cover 40, so that the fuse section 522 cannot be easily contact with the electrolyte, which improves a safety performance of the secondary battery 20; and the first terminal 51 and the second terminal 52 are stacked along the axial direction X of the electrode lead-out holes 41, and the first connecting section 511 and the second connecting section 512 are distributed in the radial direction, and the third connecting section 521, the fuse section 522, and the fourth connecting section 523 are distributed in the radial direction, thus it facilitates reducing an overall thickness of the terminal assembly 50 in the axial direction, thereby reducing an overall size of the secondary battery 20 in the axial direction and increasing an energy density of the secondary battery 20.

The fuse section 522 in the second terminal 52 according to the disclosure is not directly connected to the second connecting section 512, but is connected to the second connecting section 512 through the fourth connecting section 523. In this way, a connection area between the fourth connecting section 523 and the second connecting section 512 becomes larger, thus as compared to a fuse section 522 directly connected to a second connection 512, a connection strength of the fourth connecting section 523 and the second connecting section 512 becomes greater, and the fourth connecting section 523 and the second connecting section 512 can be stably and reliably connected.

If the fuse section 522 is directly welded to the second connecting section 512, it results in that the welding process cannot be easily controlled since the connection area is small and there may be false welding, which causes an overcurrent capacity of the welding portion to be less than that of the fuse section 522, so that when a predetermined fuse requirement is not met, the welding portion will be melted earlier than the fuse section 522, which affects the safety of use of the secondary battery 20. When the fourth connecting section 523 and the second connecting section 512 are connected by welding, the welding process can be more easily controlled, and it is not easy for the false welding to occur.

In some embodiments, the first connecting section 511 and the second connecting section 512 form an integral structure. The third connecting section 521, the fuse section 522, and the fourth connecting section 523 form an integral structure, so that it is not needed to connect the fuse section 522 with the third connecting section 521 and/or the fourth connecting section 523 by welding, riveting, bonding, etc., and thereby a possibility that the connection of the fuse section 522 with the third connecting section 521 and/or the fourth connecting section 523 will be broken due to an external force so that a main circuit will be unexpectedly cut off will be reduced. In this embodiment, one fuse section 522 is disposed between the third connecting section 521 and the fourth connecting section 523. In some other optional embodiments, two or more fuse sections 522 are disposed between the third connecting section 521 and the fourth connecting section 523.

In some embodiments, an overcurrent capacity of the fuse section 522 is smaller than an overcurrent capacity of the third connecting section 521, and also smaller than an overcurrent capacity of the fourth connecting section 523, thus when the secondary battery 20 is overloaded, the terminal assembly 50 will first be fused at the fuse section 522 to cut off the main circuit, which reduces a possibility that the third connecting section 521 and the fourth connecting section 523 will be fused at other positions so that the fuse section 522 fails to function.

In some other optional embodiments, as shown in FIG. 6, along the radial direction of the electrode lead-out hole 41, a notch 522a is disposed at a middle area of the fuse section 522, so that an overcurrent capacity of the middle area is smaller than that of other portions of the fuse section 522, and thereby the fuse section 522 is broken at the middle area when the fuse section 522 is fused, which reduces a possibility of after-fusing re-contacting.

Figure 7:
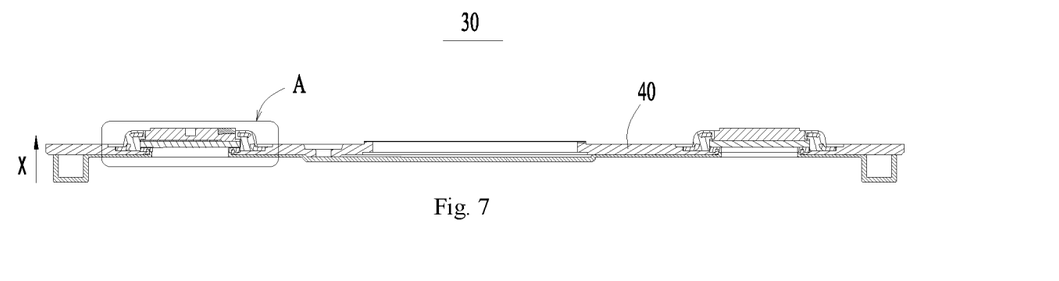
FIG. 7 is a structural section view of an end cover assembly disclosed in an embodiment of the disclosure.
Figure 8:
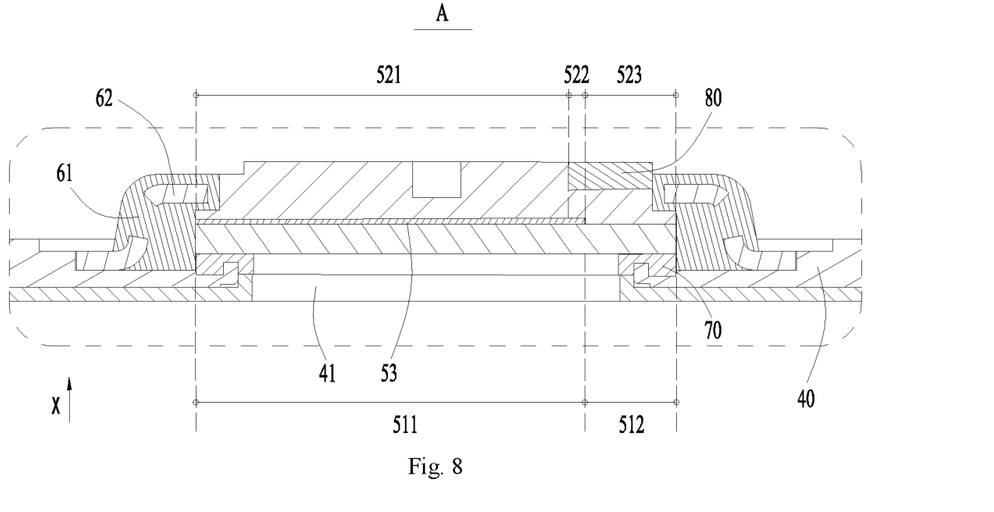
FIG. 8 is an enlarged view of a portion A in FIG. 7.

In some embodiments, referring to FIGS. 7 and 8, along the axial direction X of the electrode lead-out hole 41, an orthographic projection of the first connecting section 511 and an orthographic projection of the third connecting section 521 completely overlap with each other. In some other optional embodiments, along the axial direction X of the electrode lead-out hole 41, the orthographic projection of the first connecting section 511 and the orthographic projection of the third connecting section 521 may partially overlap with each other. In FIG. 8, vertical dashed lines for showing the first connecting section 511, the second connecting section 512, the third connecting section 521, and the fourth connecting section 523 are only used to illustrate the first connecting section 511, the second connecting section 512, the third connecting section 521 and the fourth connecting section 523, instead of limiting other structures or representing physical structures.

In some embodiments, referring to FIGS. 7 and 8, the terminal assembly 50 blocks the electrode lead-out hole 41 from the outer side of the end cover 40. The first terminal 51, the insulating component 53 and the second terminal 52 are stacked in the axial direction X of the electrode lead-out hole 41. The second terminal 52 is located at a side of the first terminal 51 away from the end cover 40. The first connecting section 511 of the first terminal 51 is configured to electrically connect with the electrode assembly 22. The first connecting section 511 may be electrically connected with the tab 222 of the electrode assembly 22 through the connecting component 23, or may be directly electrically connected with the tab 222 of the electrode assembly 22. The third connecting section 521 is configured to electrically connect with the busbar 90. In an example, the third connecting section 521 may be connected to the busbar 90 by welding such as laser welding or thermal welding. The second connecting section 512 is configured to electrically connect with the fourth connecting section 523. Along the axial direction X of the electrode lead-out hole 41, the second connecting section 512 and the fourth connecting section 523 are stacked, and the connection area of the second connecting section 512 and the fourth connecting section 523 is located at the outer side of the end cover 40. In one example, the second connecting section 512 and the fourth connecting section 523 are connected by welding.

Referring to FIG. 8, since the first terminal 51 can block the electrode lead-out hole 41 from the outer side of the end cover 40, and the fuse section 522 is located at the outer side of the first terminal 51, the first terminal 51 can protect the fuse section 522 so that the fuse section will not contact the electrolyte, which thereby improves the safety performance of the secondary battery 20; and the first terminal 51 and the second terminal 52 are stacked along the axial direction X of the electrode lead-out hole 41, and the first connecting section 511 and the second connecting section 512 are distributed in the radial direction, and the third connecting section 521, the fuse section 522, and the fourth connecting section 523 are distributed in the radial direction, thus it facilitates reducing an overall thickness of the terminal assembly 50 in the axial direction and thereby reducing an overall size of the secondary battery 20 in the axial direction and increasing an energy density of the secondary battery 20.

In some embodiments, referring to FIG. 8, in the axial direction X of the electrode lead-out hole 41, there is a gap between the fuse section 522 and the first terminal 51. The insulating component 53 extends between the fuse section 522 and the first connecting section 511, and a part of the insulating component 53 is located in the above gap, which can reduce a possibility that metal debris generated when the fuse section 522 is fused contacts both the first terminal 51 and the third connecting section 521, and thereby reduce a possibility that the cut-off main circuit re-forms a current path, and improve the safety of the secondary battery. In the axial direction X of the electrode lead-out hole 41, an orthographic projection of the fuse section 522 is located within an orthographic projection of the insulating component 53. In some other optional embodiments, in the axial direction X of the electrode lead-out hole 41, the orthographic projection of the fuse section 522 intersects with the orthographic projection of the insulating component 53, i.e., a part of the orthographic projection of the fuse section 522 is located outside the orthographic projection of the insulating component 53.

In some embodiments, referring to FIG. 8, both a surface of the third connecting section 521 facing the first connecting section 511 and a surface of the first connecting section 511 facing the third connecting section 521 are flat surfaces. Two opposite surfaces of the insulating component 53 along the axial direction X of the electrode lead-out hole 41 are also flat surfaces. A surface of the first connecting section 511 facing the electrode lead-out hole 41 is also flat surface. In this way, it facilitates further reducing the overall thickness of the terminal assembly 50 and increasing the energy density of the secondary battery 20.

In some embodiments, referring to FIGS. 5 and 8, the end cover assembly 30 further includes a fixing component 60. The terminal assembly 50 and the end cover 40 are connected and fixed through the fixing component 60. The fixing component 60 can limit movements of the terminal assembly 50 along the axial direction X and the radial direction of the electrode lead-out hole 41 to reduce a possibility of relative movement between the terminal assembly 50 and the end cover 40. A part of the fixing component 60 is located at a side of the terminal assembly 50 away from the end cover 40. At a side of the third connecting section 521 away from the first connecting section 511, this part presses against an edge of the third connecting section 521, so that the first terminal 51 and the second terminal 52 are fixed to the end cover 40 through the fixing component 60. The fixing component 60 can apply a pressure in the axial direction X of the electrode lead-out hole 41 to the terminal assembly 50, and the terminal assembly 50 can apply a pressure in the axial direction to the sealing component 70.

When the secondary battery 20 expands, there is a trend that two adjacent secondary batteries 20 move away from each other, so that the busbar 90 can pull the third connecting section 521 to cause the third connecting section 521 to be displaced. In this way, when the third connecting section 521 is subjected to an external force, it reduces unnecessary damages such as breaking of the fuse section 522 resulted from the third connecting section 521 pulling the fuse section 522.

In some embodiments, referring to FIG. 8, the edge of the third connecting section 521 has a stepped structure, and the fixing component 60 presses against an outermost flange at the edge. At a side of the second connecting section 512 away from the end cover 40, a part of the fixing component 60 presses against an edge of the second connecting section 512. The fixing component 60 has an annular structure. A part of the third connecting section 521 protrudes from the fixing component 60 and is configured to connect with the busbar 90. In an example, the fixing component 60 includes an insulator 61 and a support 62. A part of the support 62 is embedded in the insulator 61, so that the insulator 61 and the support 62 are connected and fixed to each other. The fixing component 60 presses a surface of the terminal assembly 50 away from the end cover 40 through the insulator 61. The fixing component 60 is welded to the end cover 40 through the support 62.

In some embodiments, as shown in FIG. 8, at a side of the fourth connecting section 523 away from the end cover 40, a part of the fixing component 60 presses against an edge of the fourth connecting section 523, which thereby improves an ability of the fixing component 60 to fix the second terminal 52. In this way, when the fourth connecting section 523 is subjected to an external force, it reduces unnecessary damages such as breaking of the fuse section 522 resulted from the fourth connecting section 523 moving and then pulling the fuse section 522.

In some embodiments, referring to FIGS. 6 and 8, the end cover assembly 30 further includes an insulating protection member 80. A part of the insulating protection member 80 is located at a side of the fuse section 522 away from the first terminal 51 and covers the fuse section 522, so that the insulating protection member 80 can protect the fuse section 522 and reduce a possibility that the fuse section 522 is broken due to an external force and thereby the fuse section 522 unintentionally cuts off the main circuit.

In some embodiments, as shown in FIG. 6 and FIG. 8, the insulating protection member 80 covers the fourth connecting section 523, thereby also providing insulation protection for the fourth connecting section 523, which reduces a possibility that the fourth connecting section 523 and the busbar 90 are directly electrically connected and thus reduces a possibility that the fuse section 522 fails to function due to short circuit of the fourth connecting section 523 and the busbar 90, or which reduces a possibility that the fourth connecting section 523 and the busbar 90 are electrically connected by metal debris or other conductors after the fuse section has been fused.

Figure 9:
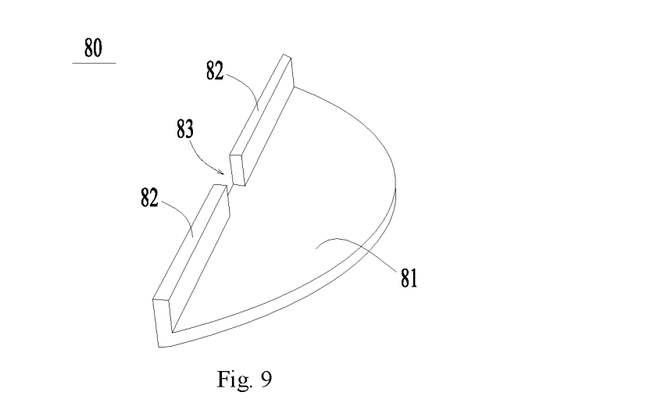
FIG. 9 is a schematic structural diagram of an insulating protection member disclosed in an embodiment of the disclosure.

In some embodiments, referring to FIG. 6, a gap 52a is formed between the third connecting section 521, the fuse section 522 and the fourth connecting section 523. Referring to FIGS. 6 and 8, the insulating protection member 80 includes a covering portion 81 and an inserting portion 82. The covering portion 81 is configured to cover the fuse section 522 and the fourth connecting section 523. The inserting portion 82 can be inserted into the gap 52a along the axial direction X of the electrode lead-out hole 41 to connect and fix the insulating protection member 80 to the second terminal 52. In an example, there may be an interference fit between the inserting portion 82 and the gap 52a, so that the insulating protection member 80 and the second terminal 52 can be conveniently assembled, and the number of parts to be used can be reduced. In another example, at least one of the fourth connecting section 523 and the fuse section 522 is adhesively connected to the covering portion 81. As shown in FIG. 9, the covering portion 81 of the insulating protection member 80 is provided with two inserting portions 82. There is an avoiding groove 83 for avoiding the fuse section 522 between the two inserting portions 82. Two gaps 52a are formed between the third connecting section 521, the fuse section 522, and the fourth connecting section 523. The two gaps 52a are disposed at two respective sides of the fuse section 522. The two inserting portions 82 are inserted into the two gaps 52a, respectively.

Figure 10:
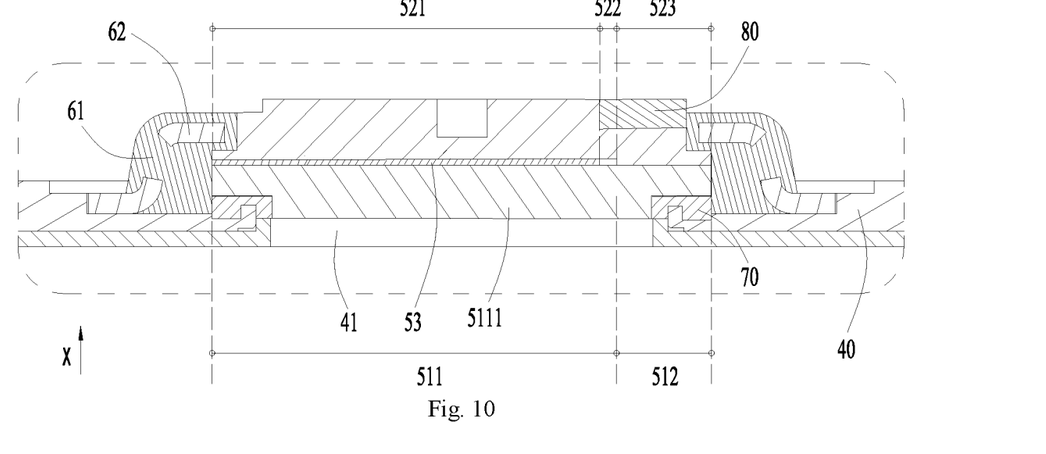
FIG. 10 is a partial sectional structural view of an end cover assembly disclosed in another embodiment of the disclosure.

In some embodiments, referring to FIG. 10, a surface of the first connecting section 511 facing the third connecting section 521 is a flat surface. The first connecting section 511 includes an extending portion 5111. The extending portion 5111 protrudes in a direction away from the third connecting section 521, and at least a part of the extending portion 5111 is located in the electrode lead-out hole 41. On one hand, since the extending portion 5111 has a larger thickness than other areas of the first connecting section 511, a connection strength of the first connecting section 511 and the connecting component 23 or the electrode assembly 22 can be ensured; and on the other hand, since the extending portion 5111 extends into the electrode lead-out hole 41, cylindrical protrusions on the connecting component 23 can be small or there may be no cylindrical protrusion on the connecting component 23, which accordingly reduces a possibility that metal debris generated when the connecting component 23 and the first connecting section 511 are welded remains in an inner hole of the protrusion, and thereby reduces a possibility that the metal debris falls from the inner hole of the protrusion onto the electrode assembly 22 to cause a short circuit of the positive electrode plate and the negative electrode plate, thus improving the safety of use of the secondary battery 20.

In some embodiments, the first connecting section 511 further includes a flange 5112 connected to the extending portion 5111. The sealing component 70 is disposed between the first terminal 51 and the end cover 40. At least a part of the flange 5112 is disposed at a side of the sealing component 70 away from the end cover 40, and at least a part of the fourth connecting section 523 is disposed at the side of the sealing component 70 away from the end cover 40. That is to say, the sealing component 70 is pressed by the flange 5112 of the first terminal 51 and the fourth connecting section 523.

Figure 12:
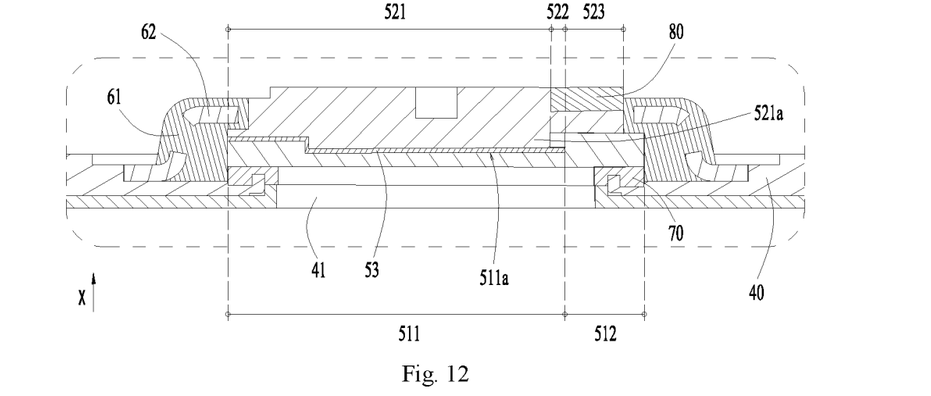
FIG. 12 is a partial sectional structural view of an end cover assembly disclosed in another embodiment of the disclosure.

In some embodiments, referring to FIG. 12, the third connecting section 521 includes a convex portion 521a protruding toward the first connecting section 511. An area on the third connecting section 521 corresponding to the convex portion 521a is configured to be welded to the busbar 90. Since the area of the third connecting section 521 where the convex portion 521a is disposed has a larger thickness than other areas, it can be ensured that when the third connecting section 521 is welded to the busbar 90, and it is not likely to weld through the third connecting section 521 to cause welding failure of the third connecting section 521 and the busbar 90.

Figure 11:
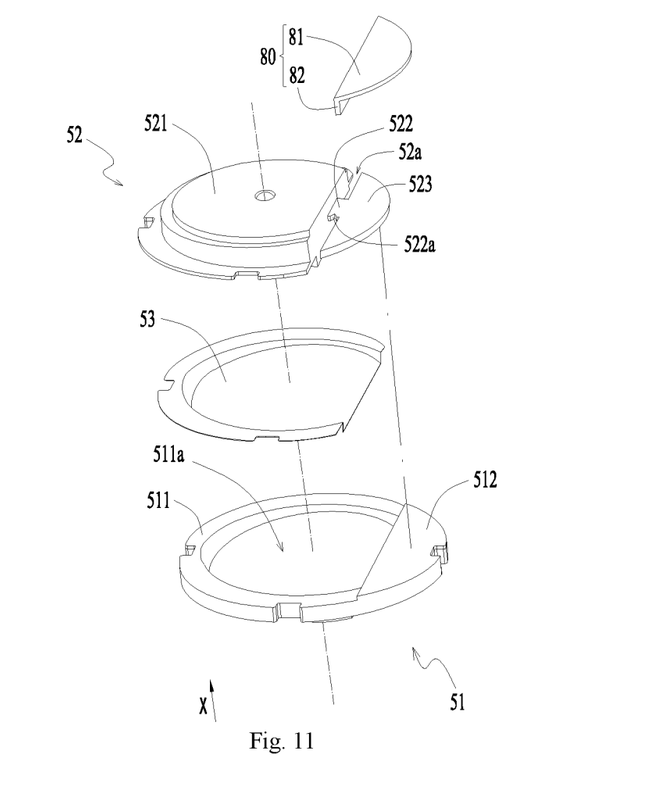
FIG. 11 is an exploded structural view of an end cover assembly disclosed in another embodiment of the disclosure.

In some embodiments, further referring to FIGS. 11 and 12, the first connecting section 511 includes a concave portion 511a for matching with the convex portion 521a of the third connecting section 521, i.e., the convex portion 521a extends into the concave portion 511a. Since the first connecting section 511 includes the concave portion 511a to receive the convex portion 521a of the third connecting portion 521, a connection strength of the third connecting section 521 and the busbar 90 is increased without increasing an overall thickness of the terminal assembly 50. A part of the insulating component 53 is located between the convex portion 521a and the concave portion 511a.

Figure 13:
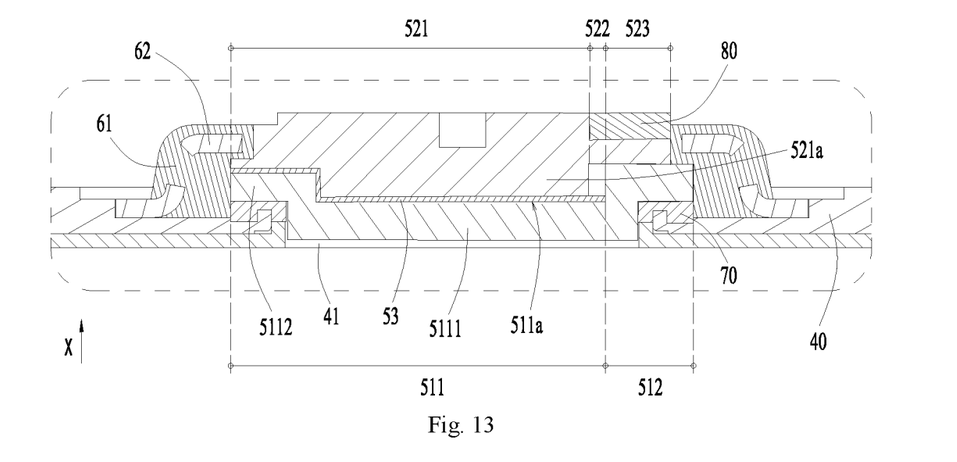
FIG. 13 is a partial sectional structural view of an end cover assembly disclosed in another embodiment of the disclosure.

In some embodiments, referring to FIG. 13, the first connecting section 511 includes an extending portion 5111. The extending portion 5111 protrudes in a direction away from the third connecting section 521, and at least a part of the extending portion 5111 is located in the electrode lead-out hole 41. The third connecting section 521 includes a convex portion 521a protruding toward the first connecting section 511. The first connecting section 511 includes a concave portion 511a for matching with the convex portion 521a of the third connecting section 521, i.e., the convex portion 521a extends into the concave portion 511a.

Figure 14:
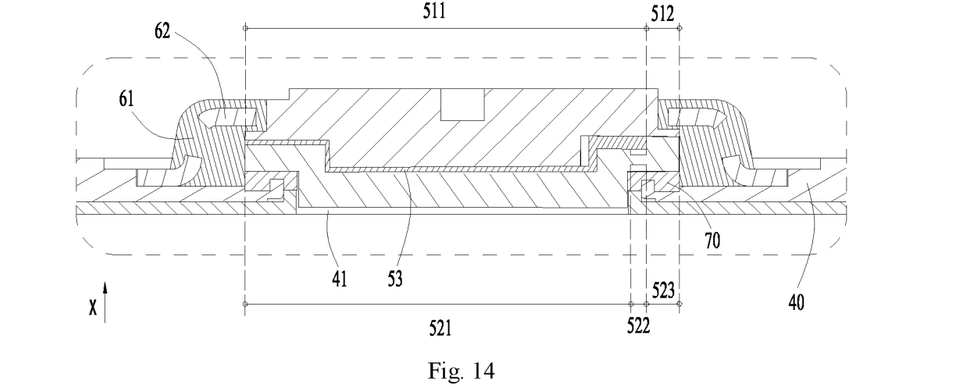
FIG. 14 is a partial sectional structural view of an end cover assembly disclosed in another embodiment of the disclosure.

In some embodiments, referring to FIG. 14, the first terminal 51 is located at a side of the second terminal 52 away from the end cover 40. The first connecting section 511 is located at a side of the third connecting section 521 away from the electrode lead-out hole 41. The third connecting section 521 of the second terminal 52 is configured to electrically connect with the electrode assembly 22. The third connecting section 521 may be electrically connected to the electrode assembly 22 through the connecting component 23, or may be directly electrically connected to the electrode assembly 22. The first connecting section 511 is configured to electrically connect with the busbar 90. In an example, the first connecting section 511 may be connected to the busbar 90 by welding such as laser welding or hot melt welding. The second connecting section 512 is located at a side of the fourth connecting section 523 away from the end cover 40. A connecting area of the second connecting section 512 and the fourth connecting section 523 is located at an outer side the end cover 40. The sealing component 70 is disposed between the second terminal 52 and the end cover 40 and seals the electrode lead-out hole 41. The fuse section 522 is disposed at the outer side of the end cover 40. In the axial direction X of the electrode lead-out hole 41, an orthographic projection of the fuse section 522 is located within an orthographic projection of the sealing component 70, thus a part of the sealing component 70 covers the fuse section 522, and the sealing component 70 protects the fuse section 522 so that the fuse section 522 will not contact the electrolyte. In this way, after the fuse section 522 has been fused, the fused structure after the fusing will not be wetted by the electrolyte to cause the third connecting section 521 and the fourth connecting section 523 to be electrically connected again, which thereby reduces a phenomenon that the main circuit cannot be cut off after the fuse section 522 has been fused, and improves the safety of the secondary battery 20.

In some embodiments, referring to FIG. 14, the insulating component 53 extends between the fuse section 522 and the first connecting section 511. When the fuse section 522 is fused, the insulating component 53 can insulate the melted structure from the first terminal 51 to reduce a possibility that the melted structure will be electrically contact with the first terminal 51 again so that the cut-off main circuit re-forms a current path. In the axial direction X of the electrode lead-out hole 41, the orthographic projection of the fuse section 522 is located within an orthographic projection of the insulating component 53. In some other optional embodiments, in the axial direction X of the electrode lead-out hole 41, the orthographic projection of the fuse section 522 intersects with the orthographic projection of the insulating component 53, i.e., a part of the orthographic projection of the fuse section 522 is located outside the orthographic projection of the insulating component 53.

The end cover assembly 30 according to embodiments of the disclosure includes the end cover 40 and the terminal assembly 50 disposed on the end cover 40. The terminal assembly 50 includes the first terminal 51 and the second terminal 52 that are stacked with respect to each other on the end cover 40. The first terminal 51 includes the first connecting section 511 and the second connecting section 512 connected along the radial direction of the electrode lead-out hole 41. The second terminal 52 includes the third connecting section 521, the fuse section 522 and the fourth connecting section 523 that are sequentially connected along the radial direction of the electrode lead-out hole 41. The terminal assembly 50 blocks the electrode lead-out hole 41 from the outer side of the end cover 40, so that the fuse section 522 of the second terminal 52 is located at the outer side of the end cover 40. In this way, it is not likely that electrolyte in the case 21 of the secondary battery 20 will be contact with the fuse section 522, which reduces a possibility that the fuse section 522 after being fused will be wetted by the electrolyte again when overcurrent occurs in the secondary battery 20 so that the third connecting section 521 and the fourth connecting section 523 will be electrically re-connected, and thereby reduces a possibility that the secondary battery 20 will catch fire or explode after the fuse section 522 has been fused, thereby improving the safety of use of the secondary battery 20.

Although the disclosure has been described with reference to the preferred embodiments, various modifications may be made to the disclosure and components may be replaced with equivalents without departing from the scope of the disclosure; and in particular, the technical features mentioned in the various embodiments can be combined in any manner as long as there is no structural conflict. The disclosure is not limited to the specific embodiments disclosed herein, but includes all technical solutions falling within the scope of the claims.

What is claimed is:

1. A secondary battery, comprising:
a case comprising an opening;
an electrode assembly disposed in the case; and
an end cover assembly, wherein the end cover assembly is connected with the case to seal the opening, and the end cover assembly comprises:
an end cover comprising an electrode lead-out hole;
a first terminal comprising a first connecting section and a second connecting section disposed along a radial direction of the electrode lead-out hole;
a second terminal comprising a third connecting section, a fuse section and a fourth connecting section that are sequentially connected along the radial direction; along an axial direction of the electrode lead-out hole, an orthographic projection of the first connecting section and an orthographic projection of the third connecting section at least partially overlap with each other, one of the first connecting section and the third connecting section is configured to connect with a busbar, the other is configured to connect with an electrode assembly, and the fourth connecting section is configured to connect with the second connecting section; and
an insulating component, at least a part of which is located between the first connecting section and the third connecting section.

2. The secondary battery according to claim 1, wherein the fuse section and the fourth connecting section form an integral structure.

3. The secondary battery according to claim 1, wherein the insulating component extends between the fuse section and the first connecting section.

4. The secondary battery according to claim 1, wherein an overcurrent capacity of the fuse section is smaller than overcurrent capacities of the third connecting section and the fourth connecting section.

5. The secondary battery according to claim 1, wherein the second terminal is located at a side of the first terminal away from the end cover.

6. The secondary battery according to claim 5, wherein the third connecting section comprises a convex portion protruding toward the first connecting section; and/or the first connecting section comprises an extending portion, which protrudes in a direction away from the third connecting section, wherein at least a part of the extending portion is located in the electrode lead-out hole.

7. The secondary battery according to claim 5, wherein the end cover assembly further comprises a fixing component, wherein a part of the fixing component at a side of the third connecting section away from the first connecting section presses against an edge of the third connecting section and/or an edge of the fourth connecting section, so that the first terminal and the second terminal are fixed to the end cover through the fixing component.

8. The secondary battery according to claim 7, wherein a part of the insulating component is located below the edge of the third connecting section and/or the edge of the fourth connecting section, and along the axial direction, an orthographic projection of the insulating component and an orthographic projection of the fixing component have an overlap area.

9. The secondary battery according to claim 5, wherein the end cover assembly further comprises an insulating protection member, and a part of the insulating protection member is located at a side of the fuse section away from the first terminal and covers the fuse section.

10. The secondary battery according to claim 9, wherein the insulating protection member covers the fourth connecting section.

11. The secondary battery according to claim 9, wherein the insulating protection member further comprises an inserting portion, and the inserting portion extends into a gap formed by the third connecting section, the fuse section and the fourth connecting section.

12. The secondary battery according to claim 1, wherein the first terminal is located at a side of the second terminal away from the end cover.

13. The secondary battery according to claim 12, wherein the end cover assembly further comprises a sealing component, wherein the sealing component is disposed between the second terminal and the end cover and seals the electrode lead-out hole, and a part of the sealing component covers the fuse section.

14. The secondary battery according to claim 2, wherein the insulating component extends between the fuse section and the first connecting section.

15. The secondary battery according to claim 14, wherein an overcurrent capacity of the fuse section is smaller than overcurrent capacities of the third connecting section and the fourth connecting section.

16. The secondary battery according to claim 15, wherein the second terminal is located at a side of the first terminal away from the end cover.

17. The secondary battery according to claim 6, wherein the end cover assembly further comprises a fixing component, wherein a part of the fixing component at a side of the third connecting section away from the first connecting section presses against an edge of the third connecting section and/or an edge of the fourth connecting section, so that the first terminal and the second terminal are fixed to the end cover through the fixing component.

18. The secondary battery according to claim 6, wherein the end cover assembly further comprises an insulating protection member, and a part of the insulating protection member is located at a side of the fuse section away from the first terminal and covers the fuse section.

19. A battery pack, comprising:
two or more secondary batteries according to claim 1; and
a busbar for connecting different secondary batteries.

20. An electric device comprising a secondary battery according to claim 1.

* * * * *